United States Patent
Wang et al.

(10) Patent No.: US 9,916,274 B2
(45) Date of Patent: Mar. 13, 2018

(54) APPARATUS AND METHOD FOR ON-CHIP CROSSBAR DESIGN IN A NETWORK SWITCH USING BENES NETWORK

(71) Applicant: CAVIUM, INC., San Jose, CA (US)

(72) Inventors: Weihuang Wang, Los Gatos, CA (US); Dan Tu, San Bruno, CA (US); Guy Hutchison, Santa Clara, CA (US); Prasanna Vetrivel, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 305 days.

(21) Appl. No.: 14/806,894

(22) Filed: Jul. 23, 2015

(65) Prior Publication Data

US 2017/0024346 A1    Jan. 26, 2017

(51) Int. Cl.
| | | |
|---|---|---|
| *H04L 12/00* | (2006.01) | |
| *G06F 13/40* | (2006.01) | |
| *G06F 13/42* | (2006.01) | |
| *H04L 12/773* | (2013.01) | |
| *H04L 12/721* | (2013.01) | |
| *H04L 12/933* | (2013.01) | |

(Continued)

(52) U.S. Cl.
CPC ...... *G06F 13/4022* (2013.01); *G06F 13/4282* (2013.01); *H04L 12/4625* (2013.01); *H04L 45/60* (2013.01); *H04L 45/72* (2013.01); *H04L 49/109* (2013.01); *H04L 45/00* (2013.01)

(58) Field of Classification Search
CPC ............. G06F 13/1673; G06F 13/4022; G06F 13/4282; G04L 12/4625; G04L 45/00; G04L 45/72

See application file for complete search history.

(56) References Cited

U.S. PATENT DOCUMENTS

| | | | | |
|---|---|---|---|---|
| 5,179,551 A | * | 1/1993 | Turner | ................ H04L 49/1515 370/388 |
| 5,940,389 A | * | 8/1999 | Yang | ..................... H04L 49/254 370/380 |

(Continued)

OTHER PUBLICATIONS

D. Nassimi & S. Sahni, Parallel Algorithms to Set Up the Benes Permutation Network. IEEE Transactions on Computers, Feb. 1982, p. 148-154, vol. C-31, No. 2, IEEE, United States.

(Continued)

*Primary Examiner* — Tammara Peyton (57) ABSTRACT

An on-chip crossbar of a network switch comprising a central arbitration component configured to allocate packet data requests received from destination port groups to memory banks. The on-chip crossbar further comprises a Benes routing network comprising a forward network having a plurality of pipelined forward routing stages and a reverse network, wherein the Benes routing network retrieves the packet data from the memory banks coupled to input of the Benes routing network and route the packet data to the port groups coupled to output of the Benes routing network. The on-chip crossbar further comprises a plurality of stage routing control units each associated with one of the forward routing stages and configured to generate and provide a plurality of node control signals to control routing of the packet data through the forward routing stages to avoid contention between the packet data retrieved from different memory banks at the same time.

30 Claims, 6 Drawing Sheets

(51) Int. Cl.
*H04L 12/46* (2006.01)
*H04L 12/701* (2013.01)

(56) References Cited

U.S. PATENT DOCUMENTS

| | | | | |
|---|---|---|---|---|
| 5,987,028 | A * | 11/1999 | Yang | H04L 49/1507 370/380 |
| 6,973,032 | B1 * | 12/2005 | Casley | H04L 45/00 370/230 |
| 7,016,305 | B1 * | 3/2006 | Michelson | H04L 49/50 370/236 |
| 8,204,049 | B2 * | 6/2012 | Rhee | H04J 14/0217 370/280 |
| 2009/0254718 | A1 * | 10/2009 | Biscondi | G06F 9/30018 711/154 |
| 2012/0066444 | A1 * | 3/2012 | Sadowski | G06F 13/1673 711/105 |
| 2016/0006654 | A1 * | 1/2016 | Fernando | H04L 45/74 370/392 |

OTHER PUBLICATIONS

T. Lee & S. Y. Liew, Parallel Routing Algorithms in Benes-Clos Networks, IEEE Transactions on Communications, Nov. 2002, p. 1841-1847, vol. 50, No. 11, IEEE, United States.

* cited by examiner

APPARATUS AND METHOD FOR ON-CHIP CROSSBAR DESIGN IN A NETWORK SWITCH USING BENES NETWORK

TECHNICAL FIELD

The present application relates to communications in network environments. More particularly, the present invention relates to on-chip crossbar design in a network switch.

BACKGROUND

Network switches/switching units are at the core of any communication network. A network switch typically includes an on-chip crossbar having a plurality of (N) input ports configured to fetch and receive packet data from a plurality of memory banks, and a plurality of (N) output port groups/network interfaces configured to output the data from the memory banks to other network devices. During its operation, the on-chip crossbar of the network switch routes the packet data received at the input ports to the port groups through multiple processing stages according to control logic of the network switch. The hardware cost of a N×N on-chip full crossbar of data/word width w is O(w N N).

Benes network is a rearrangeable nonblocking network, which can realize any arbitrary permutation between N input ports and N port groups of the on-chip crossbar via 2 $\log_2 N - 1$ stages, each containing N/2 2×2 crossbar switching nodes/units as discussed in details below. Routing of the packet data through the Benes network can be controlled and re-arranged via external control signals to the switching units within the stages of the Benes network. Given the demand for high-speed, high-data throughput of the network switch, it is desirable to implement routing control for the on-chip crossbar of the network switch based on the Benes network for high-speed parallel packet routing implementation with support of partial permutations between the input ports and the port groups of the on-chip crossbar.

The foregoing examples of the related art and limitations related therewith are intended to be illustrative and not exclusive. Other limitations of the related art will become apparent upon a reading of the specification and a study of the drawings.

SUMMARY

An on-chip crossbar of a network switch comprising a central arbitration component configured to allocate packet data requests received from one or more destination port groups to memory banks. The on-chip crossbar further comprises a Benes routing network comprising a forward network having a plurality of pipelined forward routing stages and a reverse network, wherein the Benes routing network retrieves the packet data from the memory banks coupled to input of the Benes routing network and route the packet data to the port groups coupled to output of the Benes routing network. The on-chip crossbar further comprises a plurality of stage routing control units each associated with one of the forward routing stages and configured to generate and provide a plurality of node control signals to control routing of the packet data through the forward routing stages to avoid contention between the packet data retrieved from different memory banks at the same time.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
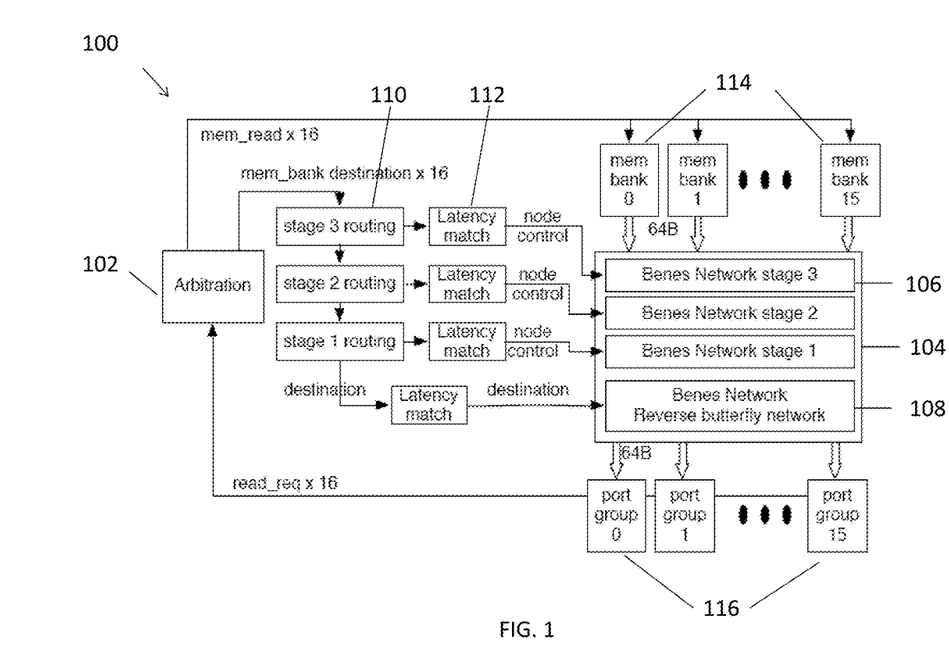
FIG. 1 illustrates an example of a top-level block diagram of an on-chip crossbar of a network switch configured to support high-speed packet data routing via a Benes network in accordance with some embodiments.

FIG. 1 illustrates an example of a top-level block diagram of an on-chip crossbar 100 of a network switch configured to support high-speed packet data routing via a Benes network. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the on-chip crossbar 100 includes a central arbitration component 102, a Benes routing network 104 having a plurality of forward routing stages 106 and a reverse butterfly network 108, a plurality of stage routing control units 110, each having an associated latency matching unit 112. Here, the Benes routing network 104 retrieves packet data from a plurality of memory banks 114 of the network switch, wherein each of the memory banks 114 includes a variety of memory types that can be but are not limited to static random-access memory (SRAM). The Benes routing network 104 provides the packet data retrieved to a plurality of port groups 116 of the network switch that request the data from the memory banks 114 at the same time and further output the data to other network devices over a network.

In the example of FIG. 1, the central arbitration component 102 determines which of the port groups 116 (destinations) may have access to which of the memory banks 114 (sources). Specifically, the central arbitration component 102 is configured to arbitrate/allocate one or more packet data requests received from the destination port groups 116 to corresponding read instructions to one or more memory banks 114 which packet data is being requested by the port groups 116. Here, multiple memory banks 114 may serve the port groups 116 in parallel at the same time, but the central arbitration component 102 ensures that each memory bank 114 serves at most one destination port group 116 during each clock cycle when more than one port groups 116 are requesting the packet data from the same memory bank.

In some embodiments, the central arbitration component 102 is also configured to translate the arbitration result between the memory banks 114 and the requesting port groups 116 into (memory bank, port group) pairs, which indicate which port groups 116 gain access to which memory banks 114. The central arbitration component 102 then provides the (memory bank, port group) pairs to the stage routing control units 110 to be utilized for the purpose of controlling the routing of the packet data through the forward routing stages of the Benes routing network 104. In some embodiments, the memory banks 114 may introduce a multi-cycle latency/delay upon receiving the read instructions from the central arbitration component 102, i.e., the requested data is not ready for routing at the output of the memory banks 114 for routing by the Benes routing network 104 until, e.g., two cycles, after the read instructions are received by the memory banks 114.

Figure 5:
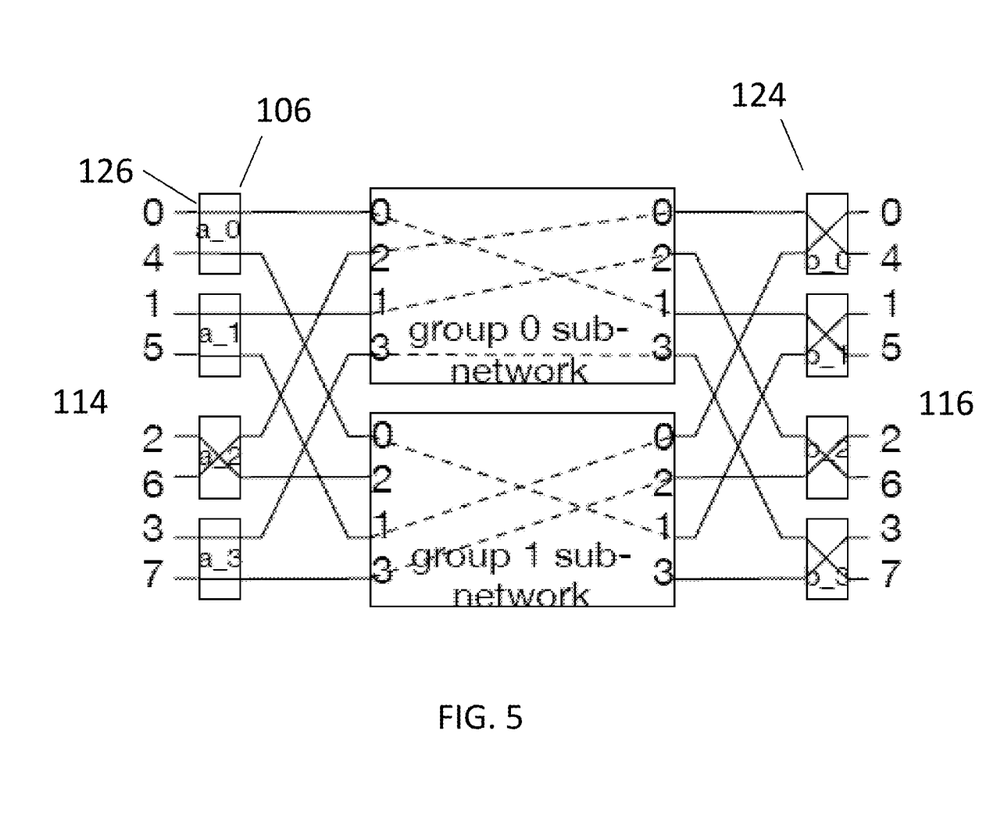
FIG. 5 depicts an example of a recursive Benes network in accordance with some embodiments.

In the example of FIG. 1, the Benes routing network 104 is the data path of the on-chip crossbar 100 and is configured to route the packet data (e.g., 64B in width) from the memory banks 114 to the port groups 116 once the packet data becomes available at the output of the memory banks 114. Here, the Benes routing network 104 has a plurality of (N) input nodes coupled to the N memory banks 114 and the same number of (N) out nodes coupled to the N port groups and comprises a plurality of routing stages. In some embodiments, the Benes routing network 104 can be logically separated into a forward network and a reverse network 108 as shown by the example of an 8×8 Benes routing network in FIG. 2, where the forward network is divided into a plurality of pipelined forward routing stages 106, e.g., Stage 2, Stage 1, etc. The number of the forward routing stages 106 in the Benes routing network 104 equals to $\log_2 N-1$, which is 2 for the example of the 8×8 Benes routing network of FIG. 2. Routing of the packet data through the forward routing stages 106 are controlled by their corresponding stage routing control units 110 as discussed below where routing control of an earlier stage (e.g., Stage 2) needs to be calculated before a later stage (e.g., Stage 1). The reverse network 108 comprises a middle routing stage 122 and a plurality of pipelined reverse routing stages 124, which mirror the configuration of the forward routing stages 106. The number of stages in the reverse network 108 is $\log_2 N$, making the total number of stages (or depth) in the Benes routing network 104 to be $2*\log_2 N-1$. Once the packet data from a memory bank 114 reaches the middle routing stage 122, it is self-routed through the reverse network 108 based on the destination addresses of the port groups 116 as designated by the central arbitration component 102. The Benes routing network 104 can also be logically separated into multiple recursive sub-networks each being half the size of the original Benes routing network as shown in the example of FIG. 5 discussed below.

Figure 2:
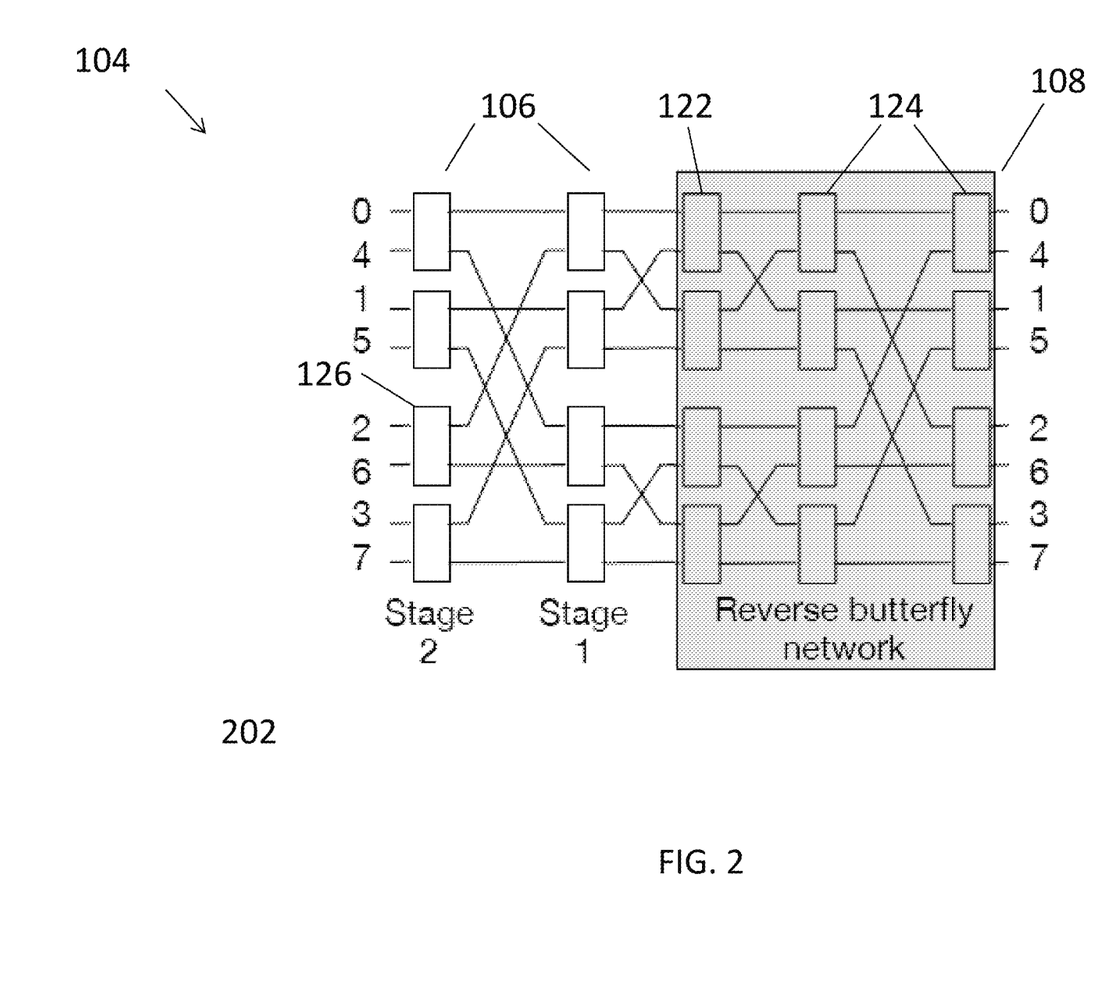
FIG. 2 depicts an example of a Benes network having a plurality of forward routing stages and a reverse routing network in accordance with some embodiments.
Figure 3:
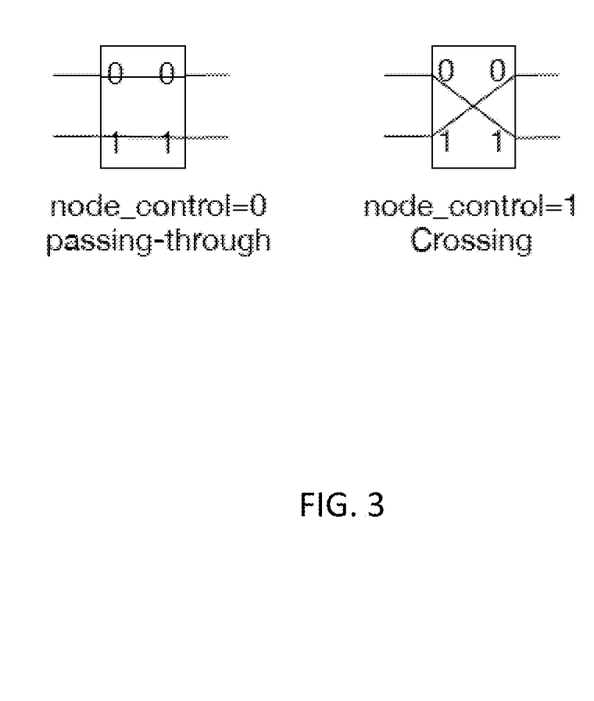
FIG. 3 depicts an example of a switch node in the routing stages of the Benes network in accordance with some embodiments.

In the example of FIG. 2, each routing stage in the Benes routing network 104 includes a plurality of (N/2) switch nodes 126, wherein each switch node 126 has two input nodes and two output nodes. As illustrated by the example of FIG. 3, each switch node 126 is configured to function in two states as controlled by a control signal (node_control):

A passing-through state where data from input nodes 0 and 1 are passed through to output nodes 0 and 1, respectively, when node_control is 0 (low).

A crossing state where data from input nodes 0 and 1 are crossed to output nodes 1 and 0, respectively, when node_control is 1 (high).

In the example of FIG. 1, the routing the packet data through the Benes routing network 104 is controlled by a plurality of stage routing control units 110, wherein each of the stage routing control units 110 is configured to control the routing of the packet data through its corresponding forward routing stage 106 by generating and providing the node control signals to the switch nodes 126 in that stage. The objective of the stage routing control units 110 is to avoid data path contention among the paths of packet data, which may happen at any of the switching nodes 126 where data at both input nodes of the switch node 126 may need to go to the same output node at the same time (during one read cycle). The stage routing control units 110 sets up the routing path for the packet data through the Benes routing network 104. In some embodiments, the stage routing control units 110 are pipelined where the next stage routing control unit 110 for the next forward routing stage 106 (e.g., Stage 2) takes the output from the current stage routing control unit 110 for the current forward routing stage 106 (e.g., Stage 1) and solves a sub (half) problem of the current stage routing control unit 110 due to the recursive nature of the Benes routing network 104 as discussed below.

In some embodiments, the first of the stage routing control units 110 (e.g., Stage 3 routing control unit) is configured to calculate the node control signals for the first forward routing stage 106 of the Benes routing network 104 while the packet data is being retrieved from the memory banks 114 during a multi-cycle delay period. In some embodiments, each of the stage routing control units 110 is coupled to an associated latency matching unit 112 configured to delay the node control signals generated by the stage routing control unit 110 so that they arrive at the corresponding forward routing stage 106 of the Benes routing network 104 at the same time as the packet data is ready for routing at the forward routing stage 106.

Figure 4:
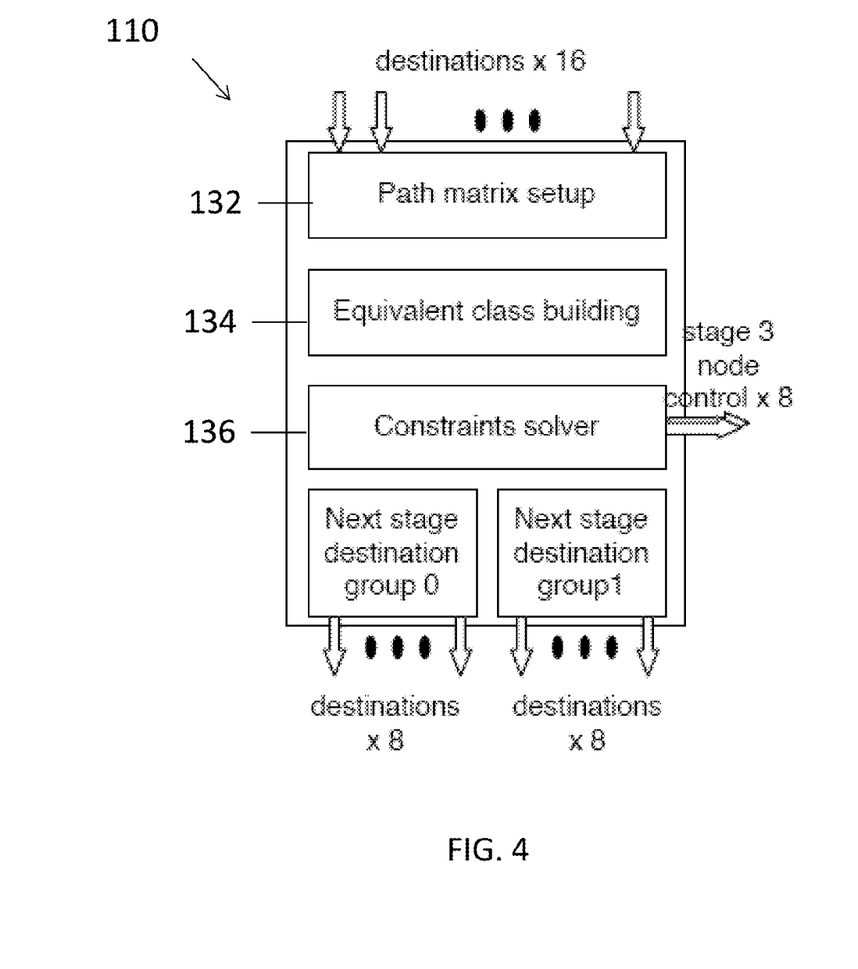
FIG. 4 depicts an example of a block diagram of a stage routing control unit in a pipeline in accordance with some embodiments.

FIG. 4 depicts an example of a block diagram of the first stage routing control unit 110 in the pipeline configured to generate a plurality of node control signals in parallel for the switch nodes 126 in the first forward routing stage 106 of the Benes routing network 104 using Boolean equations and matrix multiplications of the (memory bank, port group) pairs arbitrated by the central arbitration component 102. The rest of the stage routing control units 110 in the pipeline have similar configurations. Here, the total number of the stage routing control units 110 in the pipeline equals to the number of corresponding forward routing stages 106, i.e., $\log_2 N-1$. FIG. 5 depicts an example of a recursive 8×8 Benes routing network 104, which is the same example as the one depicted in FIG. 2 and is used to illustrate the functions and features of the first stage routing control unit 110 discussed below. The same principle also applies to the 16×16 Benes routing network 104 in FIG. 1.

As shown in FIG. 4, the stage routing control unit 110 includes a path matrix setup component 132 configured to setup a routing path matrix R for the packet data routed through its corresponding forward routing stage 106 (e.g., Stage 2 in FIG. 2), wherein the routing path matrix R reflects mapping between the input to the Benes routing network, e.g., the memory banks 114 (sources), and the output from the Benes routing network, e.g., the port groups 116 (destinations) that request the packet data from the memory banks 114. In the example of FIG. 5, {a0, a1, a2, a3} denotes input nodes 0 of the four switch nodes of the first (leftmost) forward routing stage 106 (e.g., Stage 2 as shown in FIG. 2) of the 8×8 Benes routing network 104 and {b0, b1, b2, b3} denotes output nodes 0 of the four switch nodes of the last (rightmost) reverse routing stage 124 that mirrors the first forward routing stage 106. {$\overline{a0}$, $\overline{a1}$, $\overline{a2}$, $\overline{a3}$} and {$\overline{b0}$, $\overline{b1}$, $\overline{b2}$, $\overline{b3}$} denote the input nodes 1 of the four switch nodes of the leftmost forward routing stage 106 and the output nodes 1 of the four switch nodes of the rightmost reverse routing stage 124, respectively. As shown in FIG. 5, input nodes of the four switch nodes of the leftmost forward routing stage 106 (of the 8×8 Benes routing network 104 are coupled to the output from the memory banks 114 in the order of 0/4, 1/5, 2/6, and 3/7. The output nodes of the four switch of the leftmost reverse routing stage 124 are coupled to the port groups 116 in the same order. A such, {a0, a1, a2, a3} (and {b0, b1, b2, b3}) equals {0, 1, 2, 3} and {$\overline{a0}$, $\overline{a1}$, $\overline{a2}$, $\overline{a3}$}(and {$\overline{b0}$, $\overline{b1}$, $\overline{b2}$, $\overline{b3}$}) equals {4, 5, 6, 7}.

In some embodiments, each input node of the switch nodes of the leftmost forward routing stage 106 is mapped to one of the output nodes of the switch nodes of the rightmost reverse routing stage 126 under one of the following four cases:

From input node 0 of the switch nodes of the leftmost forward routing stage 106 to output node 0 of the switch nodes of the rightmost reverse routing stage 124: denoted as $(a_i, b_j)^T$.

From input node 0 of the switch nodes of the leftmost forward routing stage 106 to output node 1 of the switch nodes of the rightmost reverse routing stage 124: denote it as $(a_i, \overline{b_j})^T$.

From input node 1 of the switch nodes of the leftmost forward routing stage 106 to output node 0 of the switch nodes of the rightmost reverse routing stage 124: denoted as $(\overline{a_i}, b_j)^T$.

From input node 1 of the switch nodes of the leftmost forward routing stage 106 to output node 1 of the switch nodes of the rightmost reverse routing stage 124: denoted as $(\overline{a_i}, \overline{b_j})^T$.

Under such mapping, the path matrix setup component 132 is configured to establish the routing path matrix R based on the (memory bank, port group) pairs arbitrated by the central arbitration component 102 and taken as input by the first stage routing control unit 110. In the example of FIG. 5, the routing path matrix R is expressed as:

$$R = \begin{bmatrix} a_0 & a_1 & a_2 & a_3 & \overline{a_0} & \overline{a_1} & \overline{a_2} & \overline{a_3} \\ \overline{b_1} & \overline{b_2} & X & \overline{b_3} & b_1 & b_0 & \overline{b_0} & b_2 \end{bmatrix}$$

where X means that the memory bank coupled to input node a2 is idle, indicating that no data is being requested from that memory bank. As shown in FIG. 5, packet data is routed from memory bank 0 to port group (destination) 5, memory bank 1 to port group 6, etc., as shown by the routing path matrix R below:

$$R = \begin{bmatrix} 0 & 1 & 2 & 3 & 4 & 5 & 6 & 7 \\ 5 & 6 & X & 7 & 1 & 0 & 4 & 2 \end{bmatrix}$$

Once the routing path matrix R is constructed, equivalent class building component 134 of the stage routing control unit 110 is configured to derive dependencies and establish equivalent classes among the switch nodes of the forward routing stage 106. First, the equivalent class building component 134 is configured to derive an initial (iteration 0) equivalent class matrix $E_0$ for the switch nodes of the forward routing stage 106 according to:

$$E_0(x, y) = [R(a_x) == R(a_y)]?-1:$$
$$[R(a_x) == \overline{R(a_y)}]?1:$$
$$[R(\overline{a_x}) == R(a_y)]?1:$$
$$[R(\overline{a_x}) == R(\overline{a_y})]?-1:0$$

where row and column index x, y $\in$ {0, . . . , N/2−1}, representing the switch nodes of the forward routing stage 106. $E_0(x, y)=1$ means $a_x$ and $a_y$ are dependent on each other, $E_0(x, y)=-1$ means $a_x$ and $a_y$ are inversely dependent on each other and $E_0(x, y)=0$ means $a_x$ and $a_y$ are unrelated under the current routing path of the packet data between the memory banks 114 and the port groups 116. The equivalent class matrix E is symmetric, where E(x, y)=E(y, x) and E(x, x)=1. According to the routing path matrix R for the example of FIG. 5, $\overline{a1}$ maps to b0 and $\overline{b0}$ maps to $\overline{a2}$. As such, $\overline{a1}$ depends on a2, i.e., $E_0(1, 2)=E_0(2, 1)=-1$. Similarly, because a1 maps to $\overline{b2}$ and b2 maps to $\overline{a3}$, a1 depends on a3, i.e., $E_0(1, 3)=E_0(3, 1)=1$. The $E_0$ corresponding to the example of the routing path matrix R is then built as:

$$E_0 = \begin{bmatrix} 1 & 0 & 0 & 0 \\ 0 & 1 & -1 & 1 \\ 0 & -1 & 1 & 0 \\ 0 & 1 & 0 & 1 \end{bmatrix}$$

For a forward routing stage 106 having N/2 switch nodes 126, the equivalent class building component 134 takes $\log_2(N/2)$ iterations to resolve all dependencies among the switch nodes 126 through multiple iterations of equivalent class matrix $E_k$, k $\in$ {0, . . . , $\log_2(N/2)$}. Here, the equivalent class matrix Ek at iteration k is calculated by the equivalent class building component 134 according to $E_k = E_{k-1} \otimes E_{k-1}$, where each element in $E_k$ is a sum-of-product operation suitable for hardware parallel implementation. Due to symmetry of the equivalence class matrix $E_k$, each matrix multiplication requires (N/2−1)+(N/2−2)+ . . . 1=N (N−2)/8 sum-of-product operations. Each equivalent class matrix Ek contains dependent information of distance $2^k$ from the routing path matrix and the final equivalent class matrix $E_{\log_2(N/2)}$ contains all the dependent information of the switch nodes 126 {a0, a1, . . . , $a_{N/2-1}$}. In the example of FIG. 5, where N=8, it takes two iterations to resolve all dependencies among the switch nodes 126, with $E_1 = E_0 \otimes E_0$ calculated as:

$$E_1 = \begin{bmatrix} 1 & 0 & 0 & 0 \\ 0 & 1 & -1 & 1 \\ 0 & -1 & 1 & 0 \\ 0 & 1 & 0 & 1 \end{bmatrix} \otimes \begin{bmatrix} 1 & 0 & 0 & 0 \\ 0 & 1 & -1 & 1 \\ 0 & -1 & 1 & 0 \\ 0 & 1 & 0 & 1 \end{bmatrix} = \begin{bmatrix} 1 & 0 & 0 & 0 \\ 0 & 1 & -1 & 1 \\ 0 & -1 & 1 & -1 \\ 0 & 1 & |-1 & 1 \end{bmatrix}$$

where $$E_1[2,3] = \text{OR}\ (E_0[2,:] \otimes E_0[:,3])$$

$$= \text{OR}\left( [0\ -1\ 1\ 0] \otimes \begin{bmatrix} 0 \\ 1 \\ 0 \\ 1 \end{bmatrix} \right)$$

$$= 0 \otimes 0\ \text{OR}\ (-1) \otimes 1\ \text{OR}\ 1 \otimes 0\ \text{OR}\ 0 \otimes 1$$

$$= 0\ \text{OR}\ (-1)\ \text{OR}\ 0\ \text{OR}\ 0$$

$$= -1$$

In the second iteration, $$E_2 = E_1 \otimes E_1 = \begin{bmatrix} 1 & 0 & 0 & 0 \\ 0 & 1 & -1 & 1 \\ 0 & -1 & 1 & -1 \\ 0 & 1 & -1 & 1 \end{bmatrix}$$

In this particular example, $E_1$ and $E_2$ are identical since a1 is dependent with a2 and a3, the distance from a2 to a3 is 2, and all dependencies are resolved after iteration 1. In some cases, however, the dependency can go up to distance of $N/2-1=3$, which requires all $\log_2(N/2-1)=\log_2(N/2)=2$ iterations to resolve, for N being power of 2.

After the all dependencies among the switch nodes 126 are resolved through the equivalent class matrixes, constraints resolving component 136 of the stage routing control unit 110 is configured to generate node control signals for the switch nodes of the corresponding forward routing stage 106. Specifically, the constraints resolver 136 is configured to transform the dependencies and equivalent classes obtained from the equivalent class building component 134 into a control matrix A as following:

for row $x \in \{0, 1, \ldots, N/2-1\}$, if $\oplus E_k[x, x-1:0]! = 0$, then reset the entire row of $E_k[x,:]$ to 0's.

replace each 1 (positively-dependent) to be value of 0 and −1 (inversely-dependent) to be value of 1.

Under such rules, the control matrix A for the example of $E_2$ discussed above becomes:

$$A = \begin{bmatrix} 0 & 0 & 0 & 0 \\ 0 & 0 & 1 & 0 \\ 0 & 0 & 0 & 0 \\ 0 & 0 & 0 & 0 \end{bmatrix}$$

and final value of $\{a0, a1, a2, a3\}$ is obtained by bit-wise OR of each row, i.e., $$[a_0, a_1, a_2, a_3] = A[0,:] + A[1,:] + A[2,:] + A[3,:]$$

$$= [0\ 0\ 0\ 0] + [0\ 0\ 1\ 0] + [0\ 0\ 0\ 0] + [0\ 0\ 0\ 0]$$

$$= [0\ 0\ 1\ 0]$$

The constraints resolving component 136 is then configured to provide the final value of $\{a0, a1, a2, a3\}$ as node control signals for the switch nodes of the corresponding forward routing stage 106, where in this example, switch nodes a0, a1, and a3 will function in the passing-through state with their respective node control signals being 0 while the switch node a2 will function in the crossing state with its node control signal being 1.

In some embodiments, the constraints resolving component 136 is also configured to resolve the target address for the next forward routing stage 106, which, as shown by the example of FIGS. 4 and 5, includes two instances of N/2×N/2 sub-networks of the recursive Benes routing network 104. For the upper sub-network (group 0), target address for input node i equals to ai?addr$_i$: addr$_{i+N/2}$, which means if ai is true (value of 1), then pick addr$_i$, otherwise, pick value addr$_{i+N/2}$ and for the lower sub-network (group 0), target address for input node i equals to ai?addr$_{i+N/2}$: addr$_i$. The constraints resolver 136 then provides the targets addresses to the next the stage routing control unit 110 in the pipeline, which is configured to control the next forward routing stage 106 similar to the process described above.

Figure 6:
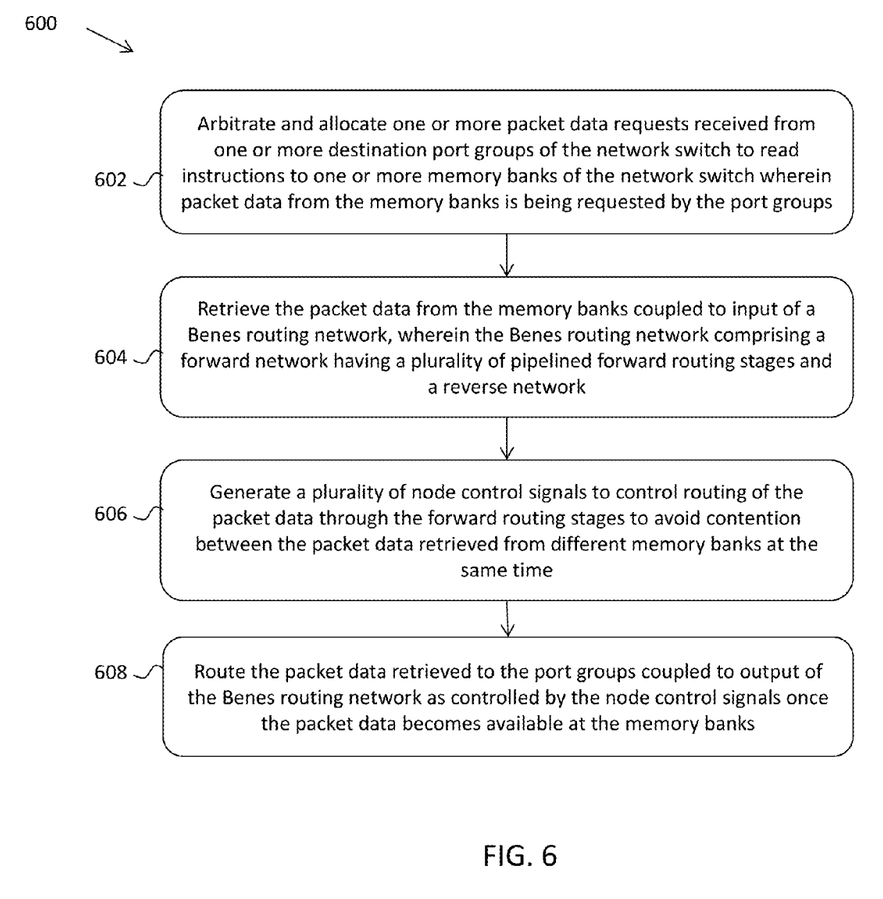
FIG. 6 depicts a flowchart of an example of a process to support high-speed packet data routing via an on-chip crossbar of a network switch in accordance with some embodiments.

FIG. 6 depicts a flowchart of an example of a process to support high-speed packet data routing via an on-chip crossbar of a network switch. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 6, the flowchart 600 starts at block 602, where one or more packet data requests received from one or more destination port groups of the network switch are arbitrated and allocated to read instructions to one or more memory banks of the network switch wherein packet data from the memory banks is being requested by the port groups. The flowchart 600 continues to block 604, where the packet data are retrieved from the memory banks coupled to input of a Benes routing network, wherein the Benes routing network comprising a forward network having a plurality of pipelined forward routing stages and a reverse network. The flowchart 600 continues to block 606, where a plurality of node control signals are generated to control routing of the packet data through the forward routing stages to avoid contention between the packet data retrieved from different memory banks at the same time. The flowchart 600 ends at block 408, where the packet data retrieved is routed to the port groups coupled to output of the Benes routing network as controlled by the node control signals once the packet data becomes available at the memory banks.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An on-chip crossbar of a network switch configured to support high-speed packet data routing, comprising:
    a central arbitration component configured to arbitrate and allocate one or more packet data requests received from one or more destination port groups of the network switch to read instructions to one or more memory banks of the network switch wherein packet data from the memory banks is being requested by the port groups;
    a Benes routing network comprising a forward network having a plurality of pipelined forward routing stages and a reverse network, wherein the Benes routing network is configured to:
        retrieve the packet data from the memory banks coupled to input of the Benes routing network;
        route the packet data retrieved to the port groups coupled to output of the Benes routing network once the packet data becomes available at the memory banks;
    a plurality of stage routing control units each associated with one of the forward routing stages and configured to generate and provide a plurality of node control signals to control routing of the packet data through the associated forward routing stage to avoid contention between the packet data retrieved from different memory banks at the same time.

2. The network switch of claim 1, wherein:
    each memory bank serves at most one port group during each clock cycle when more than one port groups are requesting the packet data from the same memory bank.

3. The network switch of claim 1, wherein:
    the central arbitration component is configured to:
        translate arbitration result between the memory banks and the requesting port groups into one or more (memory bank, port group) pairs, which indicate which port groups gain access to which memory banks;
        provide the (memory bank, port group) pairs to the stage routing control units to be utilized to control routing of the packet data through the forward routing stages of the Benes routing network.

4. The network switch of claim 1, wherein:
    number of the forward routing stages in the Benes routing network equals to $\log_2 N-1$, wherein N is the number of the memory banks.

5. The network switch of claim 1, wherein:
    the reverse network of the Benes routing network comprises a middle stage and a plurality of pipelined reverse routing stages that mirror the configuration of the forward routing stages.

6. The network switch of claim 5, wherein:
    the packet data is self-routed through the reverse network of the Benes routing network based on destination addresses of the port groups once the packet data reaches the middle routing stage.

7. The network switch of claim 1, wherein:
    each of the routing stages in the Benes routing network includes a plurality of switch nodes, wherein each switch node has two input nodes and two output nodes and is configured to function in one of a passing-through state or a crossing state as controlled by one of the node control signals.

8. The network switch of claim 1, wherein:
    the Benes routing network is logically separated into a plurality of recursive sub-networks each being half the size of the Benes routing network.

9. The network switch of claim 8, wherein:
    the stage routing control units are pipelined wherein the next stage routing control unit for the forward routing stage takes output from the current stage routing control unit for the current forward routing stage and solves a sub problem of the current stage routing control unit based on the recursive nature of the Benes routing network.

10. The network switch of claim 1, wherein:
    first of the stage routing control units is configured to calculate the node control signals for the first forward routing stage of the Benes routing network while the packet data is being retrieved from the memory banks during a multi-cycle delay period.

11. The network switch of claim 10, further comprising:
    a plurality of latency matching units each coupled to one of the stage routing control units and configured to delay the node control signals generated by the stage routing control unit so that they arrive at the corresponding forward routing stage of the Benes routing network at the same time as the packet data is ready for routing at the forward routing stage.

12. The network switch of claim 1, wherein:
    total number of the pipelined stage routing control units equals to the number of corresponding forward routing stages.

13. The network switch of claim 1, wherein:
    each of the stage routing control unit includes a path matrix setup component configured to set up a routing path matrix R for the packet data routed through its corresponding forward routing stage of the Benes routing network, wherein the routing path matrix R reflects mapping between the input to the Benes routing network and the output from the Benes routing network.

14. The network switch of claim 13, wherein:
    each of the stage routing control unit further includes an equivalent class building component configured to derive one or more dependencies among switch nodes of the forward routing stage based on the routing path matrix R.

15. The network switch of claim 14, wherein:
    the equivalent class building component is configured to derive all dependencies among the switch nodes of the forward routing stage through no more than $\log_2(N/2)$ iterations of equivalent class matrixes.

16. The network switch of claim 15, wherein:
    each of the stage routing control unit further includes a constraints resolving component configured to generate the node control signals for the switch nodes of the corresponding forward routing stage based on the dependencies among the switch nodes.

17. The network switch of claim 16, wherein:
    the constraints resolving component is configured to resolve target address for the next forward routing stage of the Benes routing network, which includes two instances of N/2×N/2 sub-networks of the Benes routing network.

18. A method to support high-speed packet data routing via an on-chip crossbar of a network switch, comprising:
    arbitrating and allocating one or more packet data requests received from one or more destination port groups of the network switch to read instructions to one or more memory banks of the network switch wherein packet data from the memory banks is being requested by the port groups;

retrieving the packet data from the memory banks coupled to input of a Benes routing network, wherein the Benes routing network comprising a forward network having a plurality of pipelined forward routing stages and a reverse network;

generating a plurality of node control signals to control routing of the packet data through the forward routing stages to avoid contention between the packet data retrieved from different memory banks at the same time;

routing the packet data retrieved to the port groups coupled to output of the Benes routing network as controlled by the node control signals once the packet data becomes available at the memory banks.

19. The method of claim 18, further comprising:
translating arbitration result between the memory banks and the requesting port groups into one or more (memory bank, port group) pairs, which indicate which port groups gain access to which memory banks;
providing the (memory bank, port group) pairs to the stage routing control units to be utilized to control routing of the packet data through the forward routing stages of the Benes routing network.

20. The method of claim 18, further comprising:
self-routing the packet data through the reverse network of the Benes routing network based on destination addresses of the port groups once the packet data reaches a middle routing stage of the reverse network.

21. The method of claim 18, wherein:
each of the routing stages in the Benes routing network includes a plurality of switch nodes, wherein each switch node has two input nodes and two output nodes and is configured to function in one of a passing-through state or a crossing state as controlled by one of the node control signals.

22. The method of claim 18, wherein:
the Benes routing network is logically separated into a plurality of recursive sub-networks each being half the size of the Benes routing network.

23. The method of claim 22, further comprising:
pipelining the stage routing control units wherein the next stage routing control unit for the forward routing stage takes output from the current stage routing control unit for the current forward routing stage and solves a sub problem of the current stage routing control unit based on the recursive nature of the Benes routing network.

24. The method of claim 18, further comprising:
calculating the node control signals for the first forward routing stage of the Benes routing network while the packet data is being retrieved from the memory banks during a multi-cycle delay period.

25. The method of claim 24, further comprising:
delaying the node control signals generated by the stage routing control unit so that they arrive at the corresponding forward routing stage of the Benes routing network at the same time as the packet data is ready for routing at the forward routing stage.

26. The method of claim 18, further comprising:
setting up a routing path matrix R for the packet data routed through its corresponding forward routing stage of the Benes routing network, wherein the routing path matrix R reflects mapping between the input to the Benes routing network and the output from the Benes routing network.

27. The method of claim 26, further comprising:
deriving one or more dependencies among switch nodes of the forward routing stage based on the routing path matrix R.

28. The method of claim 27, further comprising:
deriving all dependencies among the switch nodes of the forward routing stage through no more than $\log_2(N/2)$ iterations of equivalent class matrixes.

29. The method of claim 28, further comprising:
generating the node control signals for the switch nodes of the corresponding forward routing stage based on the dependencies among the switch nodes.

30. The method of claim 29, further comprising:
generating the node control signals for the switch nodes of the corresponding forward routing stage based on the dependencies among the switch nodes.

\* \* \* \* \*